3,520,806
SEPARATION OF LIQUID ORGANIC MATERIALS FROM SUBSTRATES

Daniel H. Haigh, Beaverton, Mich., assignor to The Dow Chemical Company, Midland, Mich., a corporation of Delaware
No Drawing. Continuation-in-part of application Ser. No. 553,021, May 26, 1966. This application May 26, 1967, Ser. No. 641,459
Int. Cl. C02b 1/14; B01d 15/00
U.S. Cl. 210—40       15 Claims

ABSTRACT OF THE DISCLOSURE

A method of separating organic liquids from substrates such as water which comprises contacting the substrate and organic liquid with a particulate cross-linked organic liquid-swellable, organic liquid-insoluble polymer, and separating the polymer with the organic liquids imbibed therein. Useful for purifying water.

---

This application is a continuation-in-part of pending application Ser. No. 553,021, filed May 26, 1966, now abandoned.

This invention relates to the separation of organic liquid materials from substrates. More particularly, this invention relates to the separation of organic liquid materials from mixtures, solutions, or dispersions thereof in water or any other liquid material which does not dissolve or swell the imbibing polymer hereinafter described. Additionally, this invention relates to the separation of organic liquid materials from the surface of solid materials.

Considerable effort is being made to reduce water pollution. One of the problems to be solved in controlling water pollution involves the effective separation of organic liquid contaminants such as fuels and oils and other liquid hydrocarbons from admixture with or from the surface of water. This includes oil spills in harbors, lakes, rivers, etc.

In accordance with the present invention, it was discovered that organic liquids can be separated from substrates by contacting said substrate and organic liquids with a cross-linked organic liquid-insoluble, organic liquid-swellable polymer, and separating the polymer with the organic liquids containing or imbibed therein.

The term "substrate" as used herein refers to the medium or vehicle in which and/or on which is contained the organic liquids to be separated. Representative substrates include solid materials, particularly the surface thereof, such as earth, metal, wood, plastic and concrete, as well as liquid materials such as water, aqueous dispersions or any other liquid material which does not dissolve or swell the imbibing polymer.

The term "organic liquid-insoluble, organic liquid-swellable polymer" as used herein refers to those polymers having the property of being substantially insoluble in, but capable of being swollen by, that is, imbibing, one or more nonaqueous organic liquids such as for example, gasolines, kerosenes, light oils, heavy oils, aromatic solvents such as benzene, toluene and xylene, terpenes and ketones, esters, phenols, aldehydes, amides, amines, mercaptans, fatty acids, fatty acid esters, halohydrocarbons, polar organic compounds, and the like. In other words, these polymers are swellable by any organic liquid which is a solvent for the polymer's linear analogue.

Preferably, cross-linked polymers of alkylstyrenes, and advantageously of tertiary-alkylstyrenes, are utilized as the imbibing agent in the process of this invention. Those alkylstyrenes which can be used to prepare these polymers have alkyl groups containing from 4 to 20, preferably from 4 to 12 carbon atoms, such as: tertiary-alkylstyrenes including for example, p-tert-butylstyrene, p-tert-amylstyrene, p-tert-hexylstyrene, p-tert-octylstyrene, p-tert-dodecylstyrene, p-tert-octadecylstyrene, and p-tert-eicosylstyrene; n-alkylstyrenes including for example n-butylstyrene, n-amylstyrene, n-hexylstyrene, n-octylstyrene, n-dodecylstyrene, n-octadecylstyrene, and n-eicosylstyrene; sec-alkylstyrenes including for example sec-butylstyrene, sec-hexylstyrene, sec-octylstyrene, sec-dodecylstyrene, sec-octadecylstyrene, and sec-eicosylstyrene; isoalkylstyrenes including for example isobutylstyrene, isoamylstyrene, isohexylstyrene, isooctylstyrene, isododecylstyrene, isooctadecylstyrene, and isoeicosylstyrene; and copolymers thereof.

Especially preferred for use in the practice of the invention are cross-linked copolymers of such alkylstyrenes as heretofore described and an alkyl ester derived from a $C_1$ to $C_{18}$ alcohol and acrylic or methacrylic acid or mixture thereof. To insure buoyancy on water as well as the capability of imbibing or being swelled by a wide range of organic liquids, it is preferred that the copolymers, such as those of p-tert-butylstyrene and methylmethacrylate, contain at least 50 mole percent of the alkylstyrene.

However, any cross-linked polymer whose linear analogue is organic liquid-soluble can be used in the process of the invention, e.g., cross-linked vinyl-addition type polymers and copolymers of essentially lipophilic monomer compositions including: alkenyl aromatic compounds such as vinyl naphthalenes, styrene, and substituted styrenes for example, alpha-methylstyrene, ring-substituted alpha-methylstyrenes, alkylstyrenes, halostyrenes, arylstyrenes, and alkarylstyrenes; methacrylic esters, acrylic esters, fumarate esters and half esters, maleate esters and half esters, itaconate esters and half esters, vinyl biphenyls, vinyl esters of aliphatic carboxylic acid esters, alkyl vinyl ethers, alkyl vinyl ketones, alpha-olefins, isoolefins, butadiene, isoprene, dimethylbutadiene, and the like.

It is important that the polymers used as imbibing agents in the prochess of my invention contain a slight amount of cross-linking agent, preferably in the range of from about 0.01 to 2 percent by weight. The most efficient imbibition of organic liquid contaminants, especially from the surface of water or aqueous dispersions, occurs when the level of cross-linking agent is less than about 1 percent since this permits the polymers to swell easily and imbibe a substantial volume of the organic liquid. When organic liquid-contaminated fluids are percolated through a packed column or bed, up to 2 percent cross-linking agent is satisfactory for the reason that a lower volume of organic liquid material imbibed by the polymer can be tolerated in this type of operation.

Cross-linking agents which can be used in preparing the imbibing polymers suitable for use in the present invention include polyethylenically unsaturated compounds such as divinylbenzene, diethylene glycol dimethacrylate, diisopropenylbenzene, diisopropenyldiphenyl, diallylmaleate, diallylphthalate, allylacrylates, allylmethacrylates, allylfumarates, allylitaconates, alkyd resin types, butadiene or isoprene polymers, cyclooctadiene, methylene norbornylenes, divinyl phthalates, vinyl isopropenylbenzene, divinyl biphenyl, as well as any other di- or poly-functional compound known to be of use as a cross-linking agent in polymeric vinyl-addition compositions. Normally, the polymer containing the cross-linking agent swells with the imbibed organic liquid. If there is too much cross-linking agent the imbibition takes an unreasonably long time or the polymer is unable to imbibe a sufficient quantity of the organic liquid, thus reducing the effectiveness of the polymer as an imbiber. If the imbibitional polymer contains no cross-linking agent or too little cross-linking agent, then it will dissolve in the organic liquid resulting, for example, in a nondiscrete, nonparticulate mass of polymer-thickened organic liquid on the surface of the water.

Various methods of carrying out the process of the present invention will be apparent. In one embodiment, the process is carried out by contacting the substrate containing the organic liquid to be removed or separated with the imbibing polymer. In another embodiment, the process is carried out by spreading or depositing imbibing polymer having a density of less than one on the organic liquid-contaminated surface of water. The water, for instance, is cleaned or purified of organic liquid contamination when the polymer containing the imbibed organic liquids is removed or separated from the surface thereof or is otherwise disposed.

In still another embodiment, the process is carried out by packing the imbibing polymer into a column or bed through which liquid containing organic liquid contaminants is passed or filtered. The effluent liquid is essentially free of organic liquid contaminants. In a further embodiment, the process is carried out by spreading or depositing the imbibing polymer on the organic liquid-contaminated surface of a solid material such as earth, concrete, metal, etc. The solid surface is cleaned of organic liquid contamination when the polymer containing the imbibed organic liquids is removed or separated therefrom or is otherwise disposed.

If it is desired to recover the organic liquids from the imbibing polymer, this can be accomplished by using a solvent exchange technique, for example.

Both the amount of swelling of the imbibing polymer particles and the amount of polymer to be used to imbibe organic liquids in the practice of this invention depend upon the amount and type of organic liquid to be imbibed, as well as the particular polymer employed and the extent to which the polymer is cross-linked. Normally, less than one, and usually less than 0.1, part by weight of imbibing polymer per part of organic liquid is used in the practice of the invention.

The process of my invention is operable at any temperature wherein the organic liquid-contaminated fluid remains in the liquid state.

The imbibing polymers used in the practice of this invention can be obtained by polymerization in solution, suspension emulsion, mass, or a coil reactor. These polymers are particulate in nature, remaining discrete, swelled polymer particles after imbibing the organic liquids.

It is contemplated that the method or process of this invention can be used in nearly any situation where it is necessary to selectively absorb organic liquids from liquids which do not dissolve or swell the imbibing polymer. One such use includes the imbibition of oily hydrocarbons, for example, from bilge-water in ships. Not only is it contemplated that the process of this invention can be used to obtain water in a purified condition substantially free of organic liquid contaminates, but also to recover organic liquids. At least occasionally these organic liquid contaminates contain valuable compounds for which economical recovery has not previously been made available.

The following nonlimiting examples serve to illustrate my invention.

EXAMPLE 1

This method of separating organic liquids from a substrate such as water was demonstrated in a series of experiments wherein kerosene was added to several beakers of water to obtain a film of oil on the surface. One gram of various imbibing polymer particles in bead form cross-linked with divinylbenzene was added to each beaker.

Substantially all of the kerosene was imbibed by the beads, and the resultant mass of discrete, swelled beads was readily picked up with a tongue depressor leaving the surface substantially oil-free. Table I presents the compositions of the various polymers used to imbibe the kerosene.

TABLE I

| Run No. | Imbibing polymer crosslinked with divinylbenzene | Weight percent of crosslinking agent |
|---|---|---|
| 1 | Tertiary-butylstyrene | 0.025 |
| 2 | do | 0.05 |
| 3 | do | 0.1 |
| 4 | do | 1.0 |
| 5 | do | 2.0 |
| 6 | Copolymer of tertiary-butyl-styrene and methylmethacrylate in a 75:25 mole ratio. | 0.05 |

EXAMPLE 2

One gram of tertiary-butylstyrene polymer beads cross-linked with divinylbenzene was added to each of several bottles containing 200 grams of either benzene or hexane. These bottles were placed in a shaker and agitated overnight at room temperature. Excess liquid was removed from the discrete, swelled beads by filtration, and the weight of the mass of beads was measured. The gel capacity of the polymer expressed as grams of solvent per gram of polymer is shown below in Table II. These runs show that the amount of organic liquid which can be imbibed by the polymer depends in part upon the degree of cross-linking and upon the nature of the organic liquid.

TABLE II

| Run No. | Weight percent of crosslinking agent | Solvent | Gel capacity, grams solvent/gram polymer |
|---|---|---|---|
| 1 | 0.025 | Benzene | 29.0 |
| 2 | 0.05 | do | 25.3 |
| 3 | 0.1 | do | 18.9 |
| 4 | 0.025 | Hexane | 17.2 |
| 5 | 0.05 | do | 13.1 |
| 6 | 0.1 | do | 8.6 |

EXAMPLE 3

Not only does the imbibing polymer imbibe the organic liquids on the surface of the water, but with adequate contact, soluble organic liquid residues in the water can be substantially reduced.

Samples of water were equilibrated with kerosene, benzene, and toluene; the excess oil was removed and an aliquot of the water was analyzed for total carbon. A second aliquot of 100 grams was equilibrated with 10 grams of p-tertiary-butylstyrene polymer particles in bead form cross-linked with 0.025 weight percent of divinylbenzene. Subsequent analysis for total carbon, after the discrete, swelled polymer particles containing the imbibed organic liquid were removed, showed a substantial reduction in dissolved organic liquid residuals. See Table III below.

TABLE III

| Organic liquid | Total residual carbon, mg. of carbon/l. | |
|---|---|---|
| | Saturated water | Treated solution |
| Kerosene | 38 | 10 |
| Toluene | 326 | 13.5 |
| Benzene | 800 | 28 |

EXAMPLE 4

Imbibition of various organic liquids by contacting them with various imbibing polymers (A) one gram each of the following imbibing polymer particles: (1) polystyrene cross-linked with 0.05 weight percent of divinylbenzene; (2) polyvinyltoluene cross-linked with 0.13 weight percent of divinylbenzene; (3) a copolymer of tertiary-butylstyrene and methylmethacrylate in a 50:50 mole ratio cross-linked with 0.05 weight percent of divinylbenzene; (4) a copolymer of tertiary-butylstyrene and styrene in a 50:50 mole ratio cross-linked with 0.05 weight percent of divinylbenzene; and (5) poly-chlorostyrene cross-linked with 0.05 weight percent of divinylbenzene, was added to each of several 4 oz. bottles containing one of the following organic liquids: (a) acetone, (b) benzene, (c) hexane, and (d) ortho-dichlorobenzene. These polymer-organic liquid mixtures were allowed to stand for 24 hours. It was observed that each of the polymers imbibed, or was swelled by, each of the organic liquids, except that cross-linked polystyrene and poly-chlorostyrene were not swelled by hexane.

(B) Following the same procedure as in part (A) except for using as the imbibing polymer tertiary-butylstyrene polymer particles cross-linked with 0.025 weight percent of divinylbenzene and, as the organic liquid, methyl ethyl ketone (MEK) in aqueous solution, it was observed that the imbibing copolymer was swelled by the MEK thus permitting, in accordance with the invention, the separation of MEK from aqueous solution.

I claim:

1. A method of separating an organic liquid from a substrate which comprises contacting said substrate and organic liquid with a particulate cross-linked organic liquid-swellable, organic liquid-insoluble polymer, wherein the polymer is composed of at least 50 mole percent of at least one alkylstyrene wherein the alkyl groups contain from 4 to 20 carbon atoms, and separating the polymer with the organic liquid imbibed therein.

2. The method of claim 1 wherein the polymer is a copolymer of tertiary-butylstyrene and styrene.

3. The method of claim 1 wherein the polymer is a copolymer of the alkylstyrene and not more than 50 mole percent of an ester of acrylic or methacrylic acid or mixture thereof.

4. The method of claim 3 wherein the alkylstyrene is a tertiary-alkylstyrene.

5. The method of claim 4 wherein the tertiary-alkylstyrene is p-tertiary-butylstyrene.

6. The method of claim 5 wherein the polymer contains p-tertiary-butylstyrene and methylmethacrylate.

7. The method of claim 3 wherein the polymer is crosslinked with divinylbenzene.

8. A method of separating an organic liquid from a substrate which comprises contacting said substrate and organic liquid with particles of a vinyl-addition polymer of essentially lipophilic monomers comprising at least 50 mole percent of at least one alkylstyrene wherein the alkyl groups contain from 4 to 20 carbon atoms cross-linked with from about 0.01 to 2 percent by weight of a polyethylenically unsaturated compound, and separating the polymer with the organic liquid imbibed therein.

9. The method of claim 8 wherein the polymer is a copolymer of tertiary-butylstyrene and styrene.

10. The method of claim 8 wherein the polymer is a copolymer of the alkylstyrene and not more than 50 mole percent of an ester of acrylic or methacrylic acid or mixture thereof.

11. The method of claim 8 wherein the alkylstyrene is a tertiary-alkylstyrene.

12. The method of claim 11 wherein the tertiary-alkylstyrene is p-tertiary-butylstyrene.

13. The method of claim 10 wherein the polymer contains p-tertiary-butylstyrene and methylmethacrylate.

14. The method of claim 8 wherein the polyethylenically unsaturated compound used as a cross-linking agent is divinylbenzene.

15. The method of separating organic liquids from mixtures thereof with water, aqueous dispersions, or any other liquid material which does not dissolve or swell the imbibing polymer, which method comprises:

contacting said mixture with particles of a polymer containing at least 50 mole percent of an alkylstyrene(s) whose alkyl group(s) contains from 4 to 20 carbon atoms, and not more than 50 mole percent of an ester of acrylic or methacrylic acid or mixture thereof, cross-linked with from about 0.01 to 2 percent by weight of a polyethylenically unsaturated compound, and separating the polymer with the organic liquids imbibed therein.

References Cited

UNITED STATES PATENTS 2,851,445   9/1958   Bloch _____ 210—40 X
2,974,178   3/1961   Hwa et al. _____ 260—674

FOREIGN PATENTS 666,990   11/1965   Belgium.

OTHER REFERENCES

Anderson, R. E. et al.: Phenol Sorption on Ion Exchange Resins, Ind. and Eng. Chem., vol. 47, January 1955, pp. 71–75.

MICHAEL E. ROGERS, Primary Examiner

U.S. Cl. X.R.

260—674